Sept. 20, 1971　　P. D. RASMUSSEN ET AL　　3,605,218
POTTER'S WHEEL WITH VARIABLE SPEED DRIVE ARRANGEMENT
Filed Dec. 8, 1969
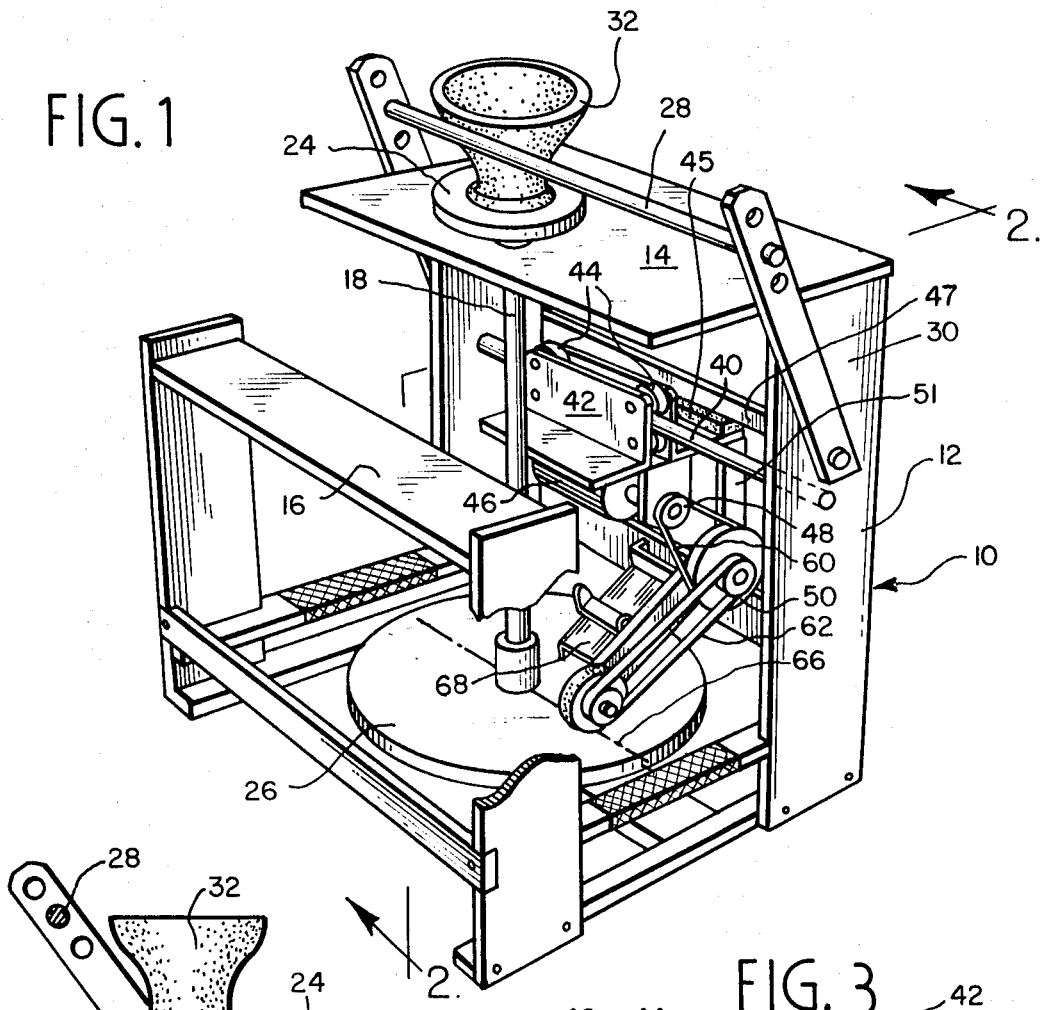
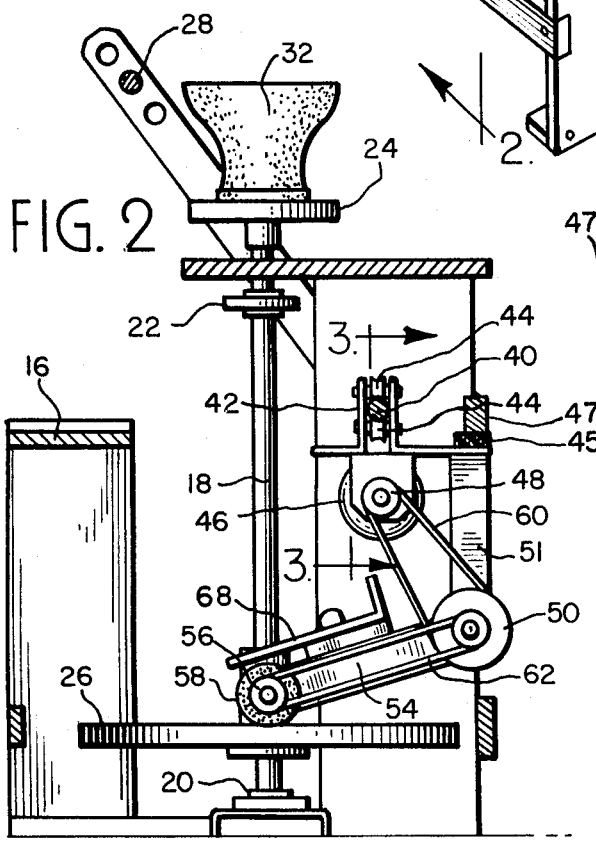
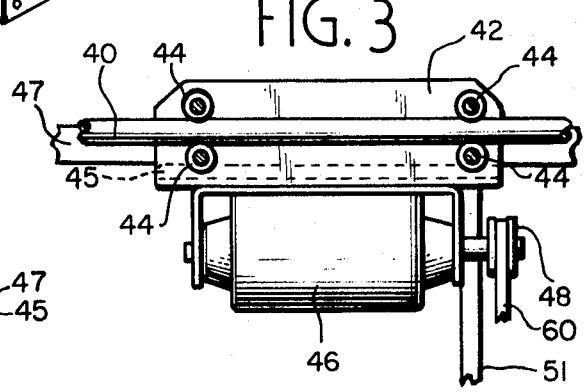
INVENTORS
Peter D. Rasmussen
Richard E. Schulze
BY *Charles F. Lind*
ATTORNEY United States Patent Office 3,605,218
Patented Sept. 20, 1971

3,605,218
POTTER'S WHEEL WITH VARIABLE SPEED
DRIVE ARRANGEMENT
Peter D. Rasmussen, 3608 W. Capitol Drive 53216, and
Richard E. Schulze, 8842 W. Custer Ave. 53225, both
of Milwaukee, Wis.
Filed Dec. 8, 1969, Ser. No. 883,023
Int. Cl. B28b 1/02
U.S. Cl. 25—24
10 Claims

ABSTRACT OF THE DISCLOSURE

A potter's wheel having a motor connected through a friction drive in turn engageable with the kick wheel at various radial locations for providing a variable speed motor drive for the potter wheel.

In forming pottery typically a potter's wheel is mounted on a shaft to rotate over a bench or table and a kick wheel connected to the same shaft under the table is located conveniently for the operator to kick with his foot. The mass of the kick and potter's wheels act as a flywheel and the frequency and effort exerted by the operator on the kick wheel determines the speed of rotation of between 60 and 200 revolutions per minute. For sustained effortless use as well as for more uniform speed control, it would be desirable to have provisions for automatically powering the potter's wheel.

This invention relates to such motor powered drive which can be engaged for rotating the potter's wheel at adjustable speeds, or alternatively which can be disengaged to permit normal manual powering of the kick wheel.

An object of this invention thus is to provide a potter's wheel having a kick wheel which can be operated manually and further which has a motor drive selectively engageable with the kick wheel suitable for powering rotating the potter's wheel even at variable speeds.

This and other objects of the invention will be better under stood after reviewing the following specifications, the accompanying drawings forming a part thereof wherein:

FIG. 1 is a perspective view of a preferred embodiment of the subject potter's wheel design;

FIG. 2 is a sectional view as seen generally from line 2—2 in FIG. 1;

FIG. 3 is an elevational view as seen generally from line 3—3 in FIG. 2.

Referring now to FIG. 1, a potter's wheel unit 10 is shown which includes typically a frame 12 having a table 14 and a bench 16 suitably spaced therefrom. A shaft 18 is extended through an opening in the table and is further rotatably supported by bearings 20 and 22 to rotate about a generally vertical axis. A potter's wheel 24 is keyed to the upper end of the shaft projecting above the table 14 and a kick wheel 26 is keyed to the lower end of the shaft. An operator thereby sitting on the bench 16 can kick the wheel 26 typically with the left foot for rotation thereof in a clockwise direction looking downwardly from the table. A bar 28 supported above the table from the side panels 30 of frame 12 provides a stabilizing support for the operator's arms while manipulating the work 32 on the potter's wheel 24.

The subject invention provides an alternate means of rotating the kick wheel in the form of an electric motor driven friction wheel. A circular rod 40 is extended laterally between the side frame panels 30 in an elevated out of the way place relative to the operator's knees and legs. A carriage 42 having spaced rollers 44 straddling the rod 40 is thereby supported on the rod in a manner that the carriage can slide axially along a rod and further can be rotated about the rod. A motor 46 is secured to the underside of the carriage 42 with its output shaft having a drive pulley 48 keyed thereto. A transfer pulley 50 is rotatably keyed to the rear frame member 51 of the carriage and a downwardly sloping foot stirrup 54 is rigidly secured to the rear frame member of the carriage. A drive wheel pulley 56 is rotatably connected to the lower end of the stirrup and has a drive wheel 58 keyed thereto adjacent the upper side of the kick plate. A continuous drive such as belt 60 connects the motor pulley 48 with the large radius track of pulley 50 and a second power belt 62 connects the small radius track of pulley 50 with the drive wheel pulley 56 thereby forming a continuous step down drive train from the motor output to the drive wheel. The drive wheel 58 typically is formed of a soft friction type material such as rubber that engages the kick wheel along radial area 66 from the shaft 18.

Under normal conditions the carriage along with its supported motor and drive is counter balanced so that the drive wheel is elevated above and is disengaged from the kick wheel. To have a motorized powering of the potter wheel, the operator need merely engage the right foot in the stirrup plate 68 and depress it to move the drive wheel against the upper surface of the kick wheel. The engaged drive wheel rotates in a clockwise direction as seen in FIG. 2 so that the driven kick wheel in turn rotates in a clockwise direction as seen in FIG. 1 looking downwardly from the table. The speed at which the potter's wheel will be rotatably driven depends on the location where the drive wheel engages the kick wheel. By laterally moving the stirrup and the carriage axially along the rod, the speed output of the potter's wheel can be varied from approximately 20 r.p.m. when the drive wheel engages the innermost portion of the kick wheel and 200 r.p.m. when the drive wheel engages the outermost radial portion of the kick wheel. This is well beyond the normal speeds utilized by potters. It is possible to rely solely on manual power of the kick wheel merely by releasing the stirrup which then disengages the drive wheel from the kick wheel. The right foot operation of the motor drive furthermore leaves the left foot normally free for concurrent manual operation of the kick wheel, if desired.

Shown also attached to the carriage 42 is a brake element 45, of rubber or the like, which engages a frame bar 47 extended between the side panels when the drive wheel 58 engages the kick wheel 26. This braking of the carriage relative to the frame concurrently of the driving engagement between the drive and kick wheels prevents unwanted carriage shifting along the rod 40 that would change the selected driving speed ratio.

What is claimed is:

1. In a potter's wheel assembly having a generally horizontal table, a vertical shaft through an opening in the table, a potter's wheel keyed to an upper projected end of the shaft for rotation therewith above the table, and a kick wheel keyed to a lower end of the shaft and for rotation therewith below the table, the combination comprising a motor, a drive wheel, means connecting the output of the motor rotatably to the drive wheel, and means supporting the drive wheel for rotation adjacent the kick wheel, said supporting means including means to accommodate vertical movement of the drive wheel between first positions frictionally engaging the kick wheel along a generally radial section of the latter and second positions spaced and disengaged from the kick wheel, means for manually controlling the vertical movement of the drive wheel, and said supporting means also including means to accommodate horizontal movement of the drive wheel between various positions spaced radially from the shaft along said radial section of the kick wheel for achieving different driving ratios between the engaged drive and kick wheels, and means for manually controlling the horizontal movement of the drive wheel.

2. A potter's wheel combination according to claim 1, wherein said supporting means includes a horizontal rod extended in spaced relation over the kick wheel, and a carriage mounted on the rod supporting the drive wheel, the carriage being movable along the rod lengthwise thereof suitable to accommodate the horizontal movement of the drive wheel.

3. A potter's wheel combination according to claim 2, wherein the carriage also supports the motor and the means connecting the motor and the drive wheel.

4. A potter's wheel combination according to claim 1, wherein said supporting means includes a horizontal circular rod extended in spaced relation over the kick wheel, and a carriage mounted on the rod supporting the drive wheel, the carriage being rotatable about the rod suitable to accommodate the vertical movement of the drive wheel.

5. A potter's wheel combination according to claim 4, wherein the carriage is also movable along the rod lengthwise thereof suitable to accommodate the horizontal movement of the drive wheel.

6. A potter's wheel combination according to claim 5, wherein the carriage also supports the motor and the means connecting the motor and the drive wheel.

7. A potter's wheel combination according to claim 5, wherein means usually urges the carriage rotationally about the rod in the direction operable to separate the drive means from the kick wheel, and the manual control means for the vertical movement of the drive wheel includes a foot plate that can be actuated to overcome this.

8. A potter's wheel combination according to claim 7, wherein said manual control means for the horizontal movement of the drive wheel includes said mentioned foot pedal.

9. A potter's wheel combination according to claim 1, wherein said supporting means include cooperating brake means effective when engaged to preclude horizontal movement of the drive wheel, said brake means being engaged only when the drive wheel is in its first vertical positions engaging the kick wheel.

10. A potter's wheel combination according to claim 6, wherein a brake on the carriage engages a brake surface supported by the table when the drive wheel is in its first vertical positions engaging the kick wheel, operable to preclude unwanted horizontal radial shifting of the drive wheel relative to the kick wheel.

References Cited

UNITED STATES PATENTS

| | | | |
|---|---|---|---|
| 2,174,061 | 9/1939 | Pereny | 25—24X |
| 2,902,741 | 9/1959 | Hankin | 25—24 |

ROBERT D. BALDWIN, Primary Examiner